(12) United States Patent
Huss et al.

(10) Patent No.: US 10,149,287 B2
(45) Date of Patent: Dec. 4, 2018

(54) METHOD AND APPARATUS FOR SENDING AND RECEIVING DOWNLINK CONTROL INFORMATION

(71) Applicant: Telefonaktiebolaget L M Ericsson (publ), Stockholm (SE)

(72) Inventors: Fredrik Huss, Sundbyberg (SE); Daniel Larsson, Vallentuna (SE); Christian Skärby, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 858 days.

(21) Appl. No.: 14/357,018

(22) PCT Filed: Jan. 16, 2014

(86) PCT No.: PCT/SE2014/050043
§ 371 (c)(1),
(2) Date: May 8, 2014

(87) PCT Pub. No.: WO2014/112937
PCT Pub. Date: Jul. 24, 2014

(65) Prior Publication Data
US 2015/0117336 A1    Apr. 30, 2015

Related U.S. Application Data

(60) Provisional application No. 61/753,086, filed on Jan. 16, 2013.

(51) Int. Cl.
*H04W 4/00* (2018.01)
*H04W 72/04* (2009.01)
*H04L 5/00* (2006.01)

(52) U.S. Cl.
CPC ......... *H04W 72/042* (2013.01); *H04L 5/0053* (2013.01); *H04L 5/001* (2013.01); *H04L 5/0094* (2013.01)

(58) Field of Classification Search
USPC .................................. 370/252, 329
See application file for complete search history.

(56) References Cited

U.S. PATENT DOCUMENTS

2011/0228732 A1* 9/2011 Luo ................... H04L 5/001
370/329
2012/0093112 A1   4/2012 Qu et al.
(Continued)

FOREIGN PATENT DOCUMENTS

CN    102158979 A    8/2011
CN    102668646 A    9/2012

OTHER PUBLICATIONS

3rd Generation Partnership Project, "3rd Generation Partnership Project; Technical Specification Group Radio Access Network; Evolved Universal Terrestrial Radio Access (E-UTRA); Multiplexing and channel coding (Release 10)", Technical Specification, 3GPP TS 36.212 V10.4.0, Dec. 1, 2011, pp. 1-79, 3GPP, France.

(Continued)

*Primary Examiner* — Yemane Mesfin
*Assistant Examiner* — Mon Cheri Davenport
(74) *Attorney, Agent, or Firm* — Coats & Bennett, PLLC

(57) ABSTRACT

A user equipment, UE, (24) is configured to receive downlink control information, DCI, transmitted to the UE (24) by a primary cell (26) in a wireless communication system (10). The UE (24) comprises one or more processing circuits (34) that shall assume that a DCI message which has a common payload size and the same first control channel element index, but different bit fields, in a common search space and a UE-specific search space is transmitted by the primary cell (26) in the common search space or the UE-specific search space, based on radio resource control, RRC, configuration of the UE (24).

27 Claims, 10 Drawing Sheets

(56) References Cited

U.S. PATENT DOCUMENTS

| | | |
|---|---|---|
| 2012/0327917 A1 | 12/2012 | Yang et al. |
| 2013/0016672 A1 | 1/2013 | Yang et al. |
| 2013/0044700 A1* | 2/2013 | Cheng ................. H04W 74/004 370/329 |
| 2014/0105164 A1* | 4/2014 | Moulsley ............ H04W 72/042 370/329 |

OTHER PUBLICATIONS

3rd Generation Partnership Project, "3rd Generation Partnership Project; Technical Specification Group Radio Access Network; Evolved Universal Terrestrial Radio Access (E-UTRA); Physical layer procedures (Release 10)", Technical Specification, 3GPP TS 36.213 V10.6.0, Jun. 1, 2012, pp. 1-125, 3GPP, France.

3rd Generation Partnership Project, "3rd Generation Partnership Project; Technical Specification Group Radio Access Network; Evolved Universal Terrestrial Radio Access (E-UTRA); Physical layer procedures (Release 11)", Technical Specification, 3GPP TS 36.213 V11.1.0, Dec. 1, 2012, pp. 1-160, 3GPP, France.

Zhang, X., et al., "Carrier Aggregation", LTE-Advanced Air Interface Technology, Sep. 5, 2012, pp. 35-93, CRC Press.

\* cited by examiner

METHOD AND APPARATUS FOR SENDING AND RECEIVING DOWNLINK CONTROL INFORMATION

RELATED APPLICATIONS

This application claims the benefit of U.S. Provisional Application No. 61/753,086, filed Jan. 16, 2013, the entire contents of which is incorporated herein by reference.

TECHNICAL FIELD

The present application generally relates to downlink control information in a wireless communication system, and particularly relates to a base station and a user equipment configured respectively to send and receive such downlink control information.

BACKGROUND

Carrier aggregation is a feature whereby multiple so-called component carriers (also referred to as "cells") are transmitted in parallel to or from the same user equipment (UE). Aggregating component carriers into a larger single overall carrier for a specific UE utilizes more spectrum for the UE and thereby enables the UE to reach a higher peak rate as compared to the rate provided by any individual component carrier. In Long Term Evolution (LTE) systems, for example, individual component carriers each comprise a backwards-compatible LTE carrier (ranging from 1.4 MHz to 20 MHz in bandwidth), meaning that aggregating these very large spectrum parts allows a UE to use more than the 20 MHz individual LTE carrier bandwidth. Of course, the aggregated component carriers need not be contiguous in the frequency domain. This enables system operators that have small (i.e., fragmented) spectrum allocations (typically from 10 MHz and below) to combine those small spectrum allocations for a specific UE.

A UE capable of carrier aggregation has one primary component carrier (i.e., one primary cell) in each of the downlink (DL) and uplink (UL) directions. Aggregated with the primary component carriers, the UE may have one or more secondary component carriers (i.e., one or more secondary cells) in each of the DL and UL. The number of secondary cells, however, need not be the same in each direction so as to be symmetrical. In some LTE releases, for example, a UE has one primary cell in each direction but asymmetrically has a secondary cell in only the DL, not the UL. In terms of component carriers, this means that the UE has 2DL carriers and a single UL carrier.

In general, the network transmits downlink control information (DCI) to a UE by transmitting a DCI message over a downlink control channel on each of the UE's downlink cells, where the DCI transmitted on a downlink cell relates to that downlink cell and an associated uplink cell. In LTE systems, for instance, the network transmits DCI to a UE by transmitting a DCI message over a physical downlink control channel (PDCCH) on each downlink cell (where one PDCCH carries one DCI message and is dedicated to a particular UE). That said, if cross-carrier scheduling is used, the network may transmit to a UE, on one downlink cell, DCI that relates to multiple cells.

A UE must monitor for whether the network has transmitted a downlink control channel intended specifically for the UE. To reduce the complexity of such monitoring, the network subjects the mapping of downlink control channels to transmission resources to a certain structure based on so-called control channel elements (CCEs). A CCE is a set of a defined number of transmission resources useful for control channel transmission (e.g., a set of 36 resource elements in LTE). The number of CCEs to which the network maps a downlink control channel (referred to as the "aggregation level") is variable. That said, the possible aggregation levels are restricted. In an LTE system, for instance, the possible aggregation levels are limited to 1, 2, 4, or 8, corresponding to the aggregation of 1, 2, 4, or 8 CCEs for a given PDCCH. The possible ways to aggregate contiguous CCEs on any given aggregation level are also restricted. For example, with CCEs sequentially indexed (e.g., as CCEs 0-39), aggregations of contiguous CCEs can only start on certain CCE indexes; that is, the first CCE index for an aggregation of contiguous CCEs is restricted. These restrictions mean that there are only certain CCEs or aggregations of CCEs (referred to herein as control channel candidates) onto which the network is able to map downlink control channels.

To prevent any given UE from having to monitor all of the control channel candidates for a channel intended for the UE, additional restrictions specify that the UE only needs to monitor a certain set of the control channel candidates. The set of control channel candidates that a particular UE must monitor is defined on an aggregation level by aggregation level basis in terms of so-called search spaces. A search space is a group of control channel candidates on a given aggregation level. Each UE has a so-called UE-specific search space (USS) for each aggregation level, where a USS as used herein is a search space defining the portion of control channel candidates on a particular aggregation level that a particular UE is to monitor. All UEs also monitor one or more common search spaces (CSSs) in addition to their UE-specific search spaces. A CSS as used herein is a search space defining a portion of control channel candidates on a particular aggregation level that all UEs are to monitor. Notably, a CSS can overlap with a USS, meaning that the candidates within the candidate set that a particular UE must monitor do not have to be unique.

A UE monitors a control channel candidate for whether a downlink control channel intended for the UE has been mapped to that candidate, by attempting to decode that control channel candidate. If the decoding attempt succeeds, the UE declares that a control channel intended for the UE is mapped to the decoded candidate and that a valid DCI message has been transmitted over the control channel. The UE then proceeds to process the valid DCI message transmitted over the channel, by interpreting the DCI message's bit fields. This monitoring process is complicated, however, by the fact that a DCI message may be formatted according to different possible so-called DCI formats. A DCI format corresponds to a certain nominal DCI message payload size and usage. LTE systems, for instance, define different DCI formats according to section 5.3.3.1.1 in TS 36.212 V10.4.0 together with section 7.2.1 in TS 36.213 V11.1.0. Since the particular DCI format used by a downlink control channel at any given time is a priori unknown to the UE, the UE must blindly detect the DCI format. This means that the UE must attempt to decode a control channel candidate according to different possible DCI formats. In general, a UE identifies the format of a DCI message transmitted over a control channel from the payload size of that DCI message, based on the assumption that different DCI formats dictate different DCI message payload sizes.

SUMMARY

Problems occur if a primary cell transmits to a user equipment (UE) a downlink control information (DCI) message which has a payload size that is commonly defined as valid in both a common search space (CSS) and a UE-specific search space (USS). If the DCI message also has the same first control channel element (CCE) index as defined in the CSS and USS (i.e., the CSS and USS overlap), the UE will deem the DCI message as valid no matter which of the CSS or the USS the DCI message was actually transmitted in. Since the DCI message's bit fields are defined differently depending on in which of the CSS or the USS the message was transmitted, ambiguity exists about how to properly interpret the message's bit fields once the message is declared valid.

Known approaches to address this ambiguity are to configure a UE to always assume that such a DCI message was transmitted by the primary cell in the CSS. These approaches, however, prove deficient under certain circumstances. For example, the approaches severely impair the coverage of a secondary cell compared to that of the primary cell. One or more embodiments herein prove advantageous over known approaches in that they use radio resource control (RRC) to configure a UE's assumption about in which of the CSS or the USS such a DCI message is transmitted by the primary cell.

More particularly, embodiments herein include a UE configured to receive DCI transmitted to the UE by a primary cell in a wireless communication system. The UE is characterized by one or more processing circuits that shall assume that a DCI message which has a common payload size and the same first control channel element index, but different bit fields, in a common search space and a UE-specific search space is transmitted by the primary cell in the common search space or the UE-specific search space, based on RRC configuration of the UE. In one or more embodiments, this means that the processing circuits shall assume that the DCI message is transmitted by the primary cell in the common search space or the UE-specific search space, based on whether a parameter in a received RRC message has a first value or a second value, respectively.

Regardless, in at least some embodiments, the one or more processing circuits shall assume by default that the DCI message is transmitted by the primary cell in the common search space.

In any event, the DCI message in some embodiments has the same DCI format in the search spaces. Alternatively, in other embodiments, the DCI message has different DCI formats in the search spaces.

Other embodiments herein include a base station configured to provide a primary cell in a wireless communication system that sends DCI to a UE. The base station is characterized by one or more processing circuits that configure the UE by RRC to assume that a DCI message which has a common payload size and the same first control channel element index, but different bit fields, in a common search space and a UE-specific search space is transmitted by the primary cell in the common search space or the UE-specific search space. In one or more embodiments, the one or more processing circuits are configured to send an RRC message to the UE with a first value or a second value for a parameter in the RRC message in order to configure the UE to assume that the DCI message is transmitted by the primary cell in the common search space or the UE-specific search space, respectively.

In some embodiments, the base station's one or more processing circuits configure the UE by RRC to assume that the DCI message is transmitted by the primary cell in the UE-specific search space, instead of assuming by default that the DCI message is transmitted by the primary cell in the common search space.

Again, the DCI message in some embodiments has the same DCI format in the search spaces. Alternatively, in other embodiments, the DCI message has different DCI formats in the search spaces.

In one or more embodiments, the base station's one or more processing circuits are configured to identify the DCI message to be sent to the UE as having the common payload size in the search spaces, even though the definition of the bit fields in the DCI message is different in the search spaces. Responsive to this identification, the one or more processing circuits configure the UE by RRC to assume that the DCI message is transmitted in the UE-specific search space. Responsive to this configuring, the one or more processing circuits schedule the DCI message to be sent to the UE.

Still other embodiments herein include corresponding methods performed by a UE and base station.

DETAILED DESCRIPTION

Figure 1:
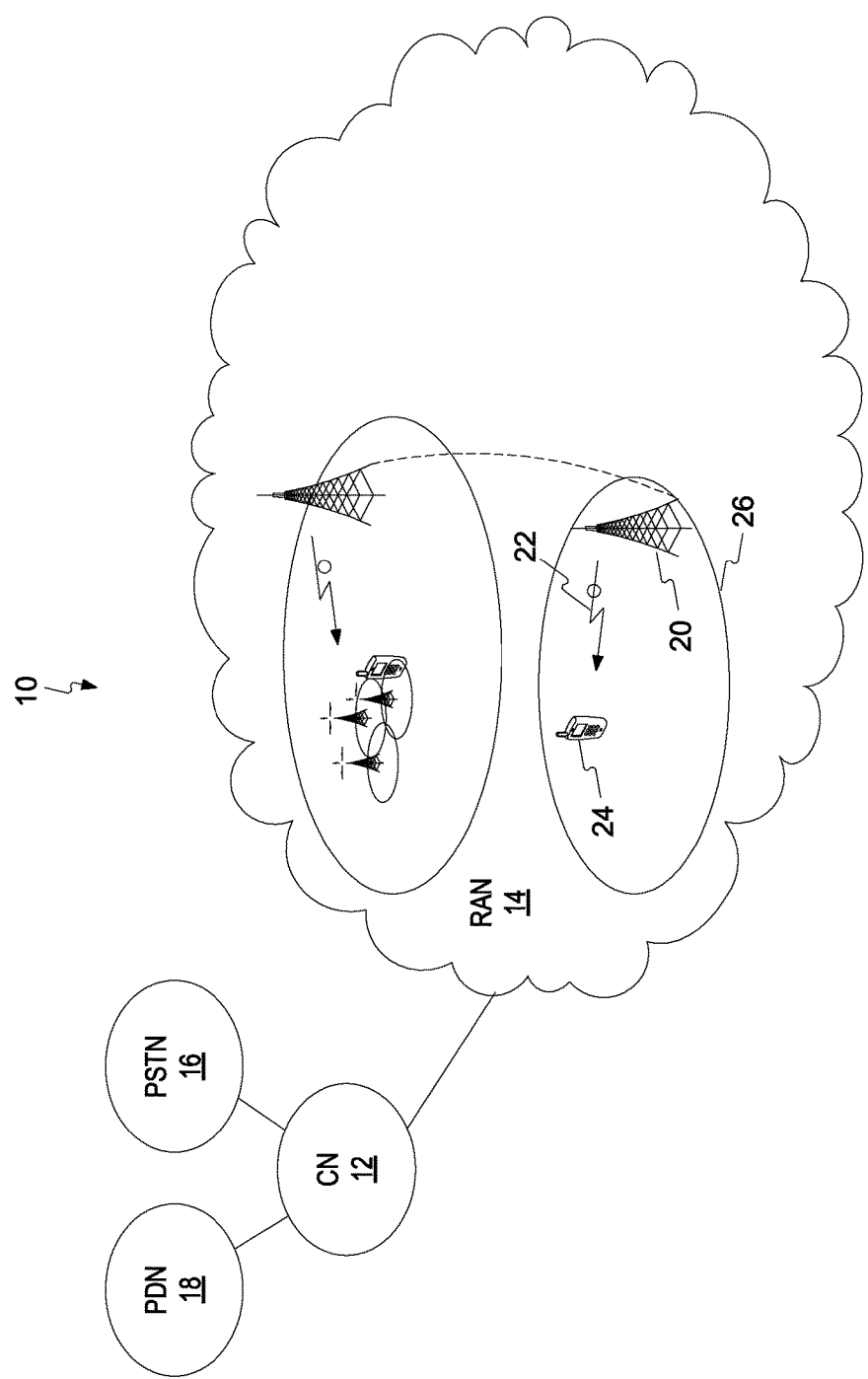
FIG. 1 is a block diagram of a wireless communication system that includes a user equipment (UE) and a base station according to one or more embodiments.

FIG. 1 illustrates a wireless communication system 10 according to one or more embodiments. As shown, a core network (CN) 12 communicatively couples a radio access network (RAN) 14 to one or more external networks, such as a public switched telephone network (PSTN) 16, a packet data network (PDN) 18 such as the Internet, or the like. The RAN 14 in some embodiments includes different radio access network deployments, such as macro access point deployments, pico access point deployments, etc. Regardless, the RAN 14 includes one or more base stations (also referred to herein as eNodeB or eNB) for wireless communication with one or more wireless communication devices (also referred to herein as user equipment, UE).

In particular, a base station 20 herein transmits a downlink component carrier 22 and an associated uplink component carrier (not shown) that provides a primary cell 26 to one or more served UEs, including UE 24. The primary cell 26 (via the base station 20) transmits downlink control information (DCI) to the served UEs by transmitting DCI messages over downlink control channels on the primary cell 26. A particular UE 24 monitors for whether the primary cell 26 has transmitted a downlink control channel intended specifically for the UE 24 by monitoring one or more common search spaces (CSSs) and UE-specific search spaces (USSs).

Under some circumstances, the primary cell 26 transmits to the UE 24 a DCI message which has a payload size that is commonly defined as valid in both a CSS and a USS. This means that, in the case the DCI message is transmitted in a USS, the DCI message payload size is also a valid DCI message in a CSS. Conversely, in the case the DCI message is transmitted in a CSS, the DCI message payload size is also a valid DCI message in a USS. This payload size is appropriately referred to herein as a common payload size since the payload size is common in both a CSS and USS. The DCI message also has the same first control channel element (CCE) index as defined in the CSS and USS (i.e., the CSS and USS overlap). The UE 24 is configured to deem such a DCI message as valid no matter which of the CSS or the USS the DCI message was actually transmitted in. The UE 24 does so despite the DCI message's bit fields being defined differently depending on in which of the CSS or the USS the message was transmitted. In order to address ambiguity that would otherwise exist about how to properly interpret the message's bit fields, one or more embodiments herein advantageously use radio resource control (RRC) to configure the UE 24 to make an assumption about in which of the CSS or the USS the DCI message is transmitted by the primary cell 26. That is, the UE 24 can be configured by RRC to assume that the received DCI message was transmitted in either the common or UE-specific search space.

Figure 2:
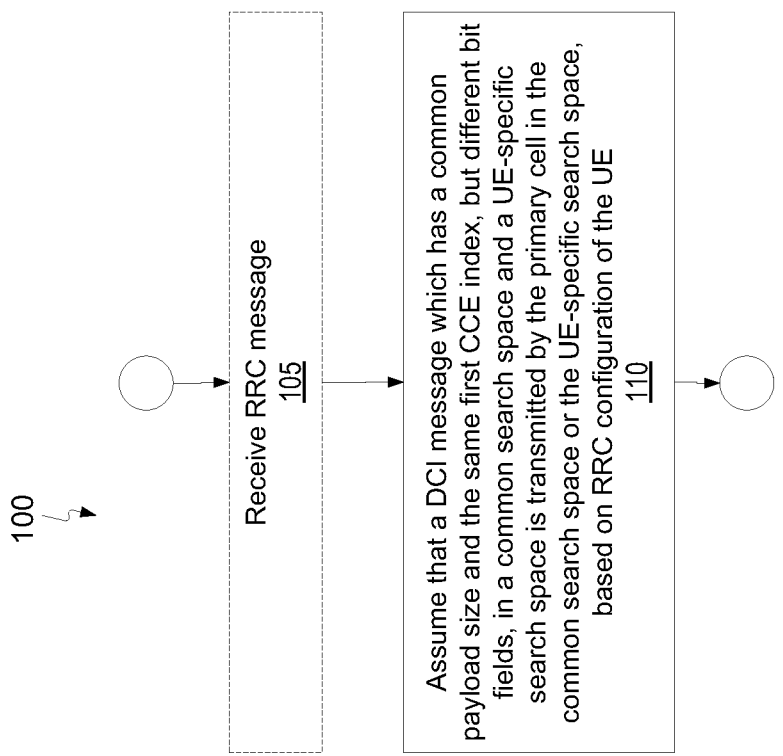
FIG. 2 is a logic flow diagram of a method implemented by a user equipment according to one or more embodiments.

FIG. 2 illustrates a method 100 performed by the UE 24 in this regard. The method 100 is implemented by the UE 24 for receiving DCI transmitted to the UE 24 by the primary cell 26 in the wireless communication system 10. The method comprises the UE 24 assuming that a DCI message which has a common payload size and the same first CCE index, but different bit fields, in a common search space and a UE-specific search space is transmitted by the primary cell 26 in the common search space or the UE-specific search space, based on RRC configuration of the UE 24 (Block 110). That is, the UE 24 shall assume that the DCI message it receives is associated with the UE-specific search space or the common search space based on the RRC configuration.

This implicitly means of course that the UE 24 receives an RRC message (Block 105), and that the UE 24 bases the above assumption on the value of a parameter in that RRC message. That is, the UE assumes that the DCI message is transmitted by the primary cell in the common search space or the UE-specific search space, based on whether a parameter in the received RRC message has a first value or a second value, respectively.

In at least some embodiments, the UE 24 assumes by default that the DCI message is transmitted by the primary cell 26 in the common search space. That is, the default value for the RRC configuration is that the UE 24 assumes that the DCI messages it receives are related to the common search space.

Note that in at least some embodiments the described DCI message is of the same DCI format type in the common search space and the UE-specific search space. That is, the DCI message has a payload size that is commonly defined in the common search space and the UE-specific search space as being valid for the same DCI format type. Despite being of the same DCI format type, though, the DCI message contains different bit fields depending on if it is located in the UE-specific search space or the common search space. This means that, responsive to receiving a DCI message which has a payload size that is commonly defined in the common search space and the UE-specific search space as being valid for a particular DCI format type, the UE 24 assumes that the DCI message was transmitted in one of those search spaces based on the UE's RRC configuration. The UE 24 thereby interprets the bit fields of the DCI message as those fields are defined in the assumed search space.

In other embodiments the described DCI message is of different DCI format types in the common search space and the UE-specific search space. That is, the DCI message has a payload size that is commonly defined in the common search space as being valid for one DCI format type and defined in the UE-specific search space as being valid for a different DCI format type. The DCI message therefore necessarily contains different bit fields depending on if it is located in the UE-specific search space or the common search space. This means that, responsive to receiving a DCI message which has a payload size that is commonly defined in the common search space as being valid for one DCI format type and defined in the UE-specific search space as being valid for a different DCI format type, the UE 24 assumes that the DCI message was transmitted in one of those search spaces based on the UE's RRC configuration. The UE 24 thereby interprets the bit fields of the DCI message as those fields are defined in the assumed search space.

Figure 3:
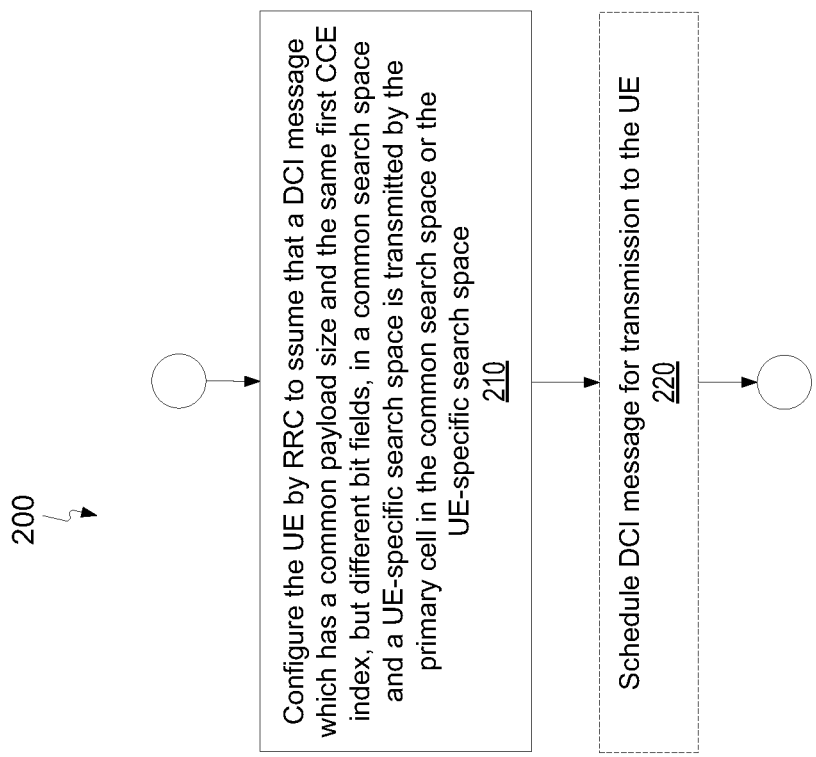
FIG. 3 is a logic flow diagram of a method implemented by a base station according to one or more embodiments.

FIG. 3 illustrates a corresponding method 200 implemented by the base station 20 providing the primary cell 26 that sends DCI to the UE 24. As shown in FIG. 3, the method 200 entails configuring the UE 24 by RRC to assume that a DCI message which has a common payload size and the same first control channel element index, but different bit fields, in a common search space and a UE-specific search space is transmitted by the primary cell 26 in the common search space or the UE-specific search space (Block 210). In at least some embodiments, responsive to configuring the UE 24 to make the above assumption for the DCI message, the base station 20 schedules the DCI message for transmission to the UE 24.

Configuring the UE 24 by RRC in this way inherently means sending an RRC message to the UE 24. In one or more embodiments, the base station 20 sends the RRC message with a first value or a second value for a parameter in the RRC message in order to configure the UE 24 to assume that the DCI message is transmitted by the primary cell 26 in the common search space or the UE-specific search space, respectively.

Of course, as previously mentioned from the perspective of the UE 24, the UE 24 may be configured to assume by default that the DCI message is transmitted by the primary cell 26 in the common search space. In this case, under circumstances when the base station 20 deems this default assumption improper, the base station 20 configures the UE by RRC to instead assume that the DCI message is transmitted by the primary cell 26 in the UE-specific search space. A parameter in an RRC message may, for instance, have a first value indicating that a default assumption is to be made (e.g., CSS) and a second value indicating that a non-default assumption is to be made (e.g., USS).

Figure 4:
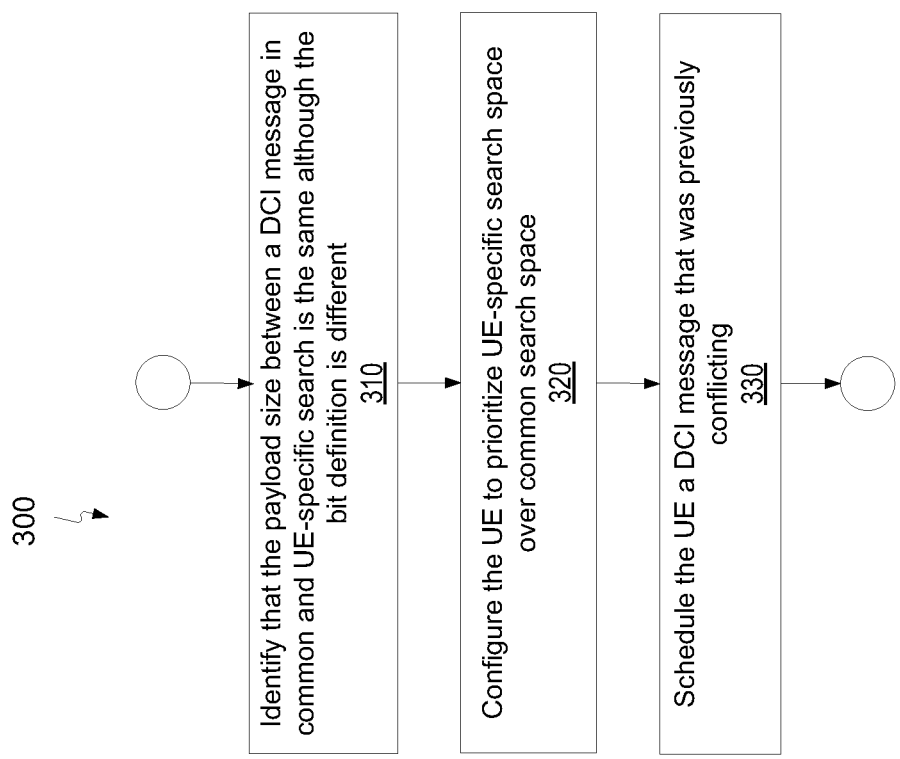
FIG. 4 is a logic flow diagram of processing performed by a base station in order to perform the method of FIG. 3.

In any event, the base station 20 in some embodiments is configured to perform the above on an ongoing and message-by-message basis as part of DCI scheduling. FIG. 4 illustrates a method performed by the base station 20 in this regard using an example where the base station 20 configures the UE to override a default assumption of CSS. As shown, the method includes identifying that the payload size between a DCI message in the common and UE-specific search spaces is the same, although the bit definition is different (i.e., conflicting) in those spaces (Block 310). To prevent the ambiguity that would otherwise result in interpreting the bit definition, therefore, the method further includes, responsive to that identification, configuring the UE 24 by RRC to prioritize the UE-specific search space over the common search space (Block 320). This inherently means that the base station 20 configures the UE 24 by RRC to assume that the DCI message is transmitted in the UE-specific search space. Responsive to such RRC configuration, the method finally entails scheduling the DCI message to be sent to the UE 24, now that the message's previously conflicting bit definitions have been resolved (Block 330).

While embodiments herein are applicable to any type of wireless communication system 10 that employs a common search space and a UE-specific search space for transmission of downlink control information, one or more embodiments prove particularly applicable to a system 10 based on Long Term Evolution (LTE) These one or more embodiments will be described below in the context of modifications to LTE releases defined by TS 36.212 V10.4.0 and TS 36.213 V11.1.0. In such embodiments, the downlink control channel as described above corresponds to a physical downlink control channel (PDCCH). Furthermore, a cyclic redundancy check (CRC) for each DCI message is scrambled by a radio network temporary identity (RNTI) assigned to the intended recipient UE, so that an explicit destination address need not be transmitted.

In this context, the method of FIG. 2 can be equivalently stated as a method implemented by the UE 24 for monitoring PDCCH candidates. As used herein, PDCCH candidates comprise the certain control channel elements (CCEs) or aggregations of CCEs onto which the PDCCH is able to be mapped. The UE 24 monitors a set of PDCCH candidates for whether a PDCCH intended for the UE 24 has been mapped to one of those candidates. This set is defined on an aggregation level by aggregation level basis in terms of common search spaces and UE-specific search spaces. Regardless, the UE 24 herein is configured to monitor PDCCH candidates with CRC scrambled by the UE's RNTI with a common payload size and the same first CCE index, but with different sets of DCI information fields, as defined in a common search space and a UE-specific search space on the primary cell 26. In doing so, the UE 24 shall assume that, for the PDCCH candidates with CRC scrambled by the UE's RNTI, either only the PDCCH in the common search space or only the PDCCH in the UE-specific search space is transmitted by the primary cell 26, depending on the RRC configuration of the UE 24.

In one or more embodiments, for example, the UE 24 shall assume that, for the PDCCH candidates with CRC scrambled by the UE's RNTI, if a parameter in an RRC message received by the UE 24 has a first value, only the PDCCH in the common search space is transmitted by the primary cell 26. Otherwise, the UE 24 shall assume that only the PDCCH in the UE-specific search space is transmitted by the primary cell.

Monitoring a PDCCH candidate as used herein entails attempting to decode the PDCCH candidate. Responsive to successfully decoding a PDCCH candidate with a common payload size and with the same first CCE index, but with different sets of DCI information fields, as defined in the common search space and the UE-specific search space, the UE 24 interprets the bit fields of the decoded candidate in accordance with the above assumption. That is, the UE 24 interprets the bit fields of a decoded candidate as those bit fields are defined in either the common search space or the UE-specific search space, depending on the UE's RRC configuration.

More particularly, though, monitoring a PDCCH candidate entails attempting to decode the PDCCH candidate according to one or more DCI formats. Responsive to successfully decoding a PDCCH candidate according to a DCI format (e.g., DCI format 0 or 1A) that has the same payload size in both the common search space (CSS) and the UE-specific search space (USS), the UE 24 herein interprets the DCI information fields of the decoded candidate as those fields are defined in the CSS or the USS, depending on the UE's RRC configuration. For example, in the case the DCI format 0/1A has a common payload and the same first CCE index between the common and UE-specific search space, the UE 24 shall assume that the DCI message it receives is associated with the UE-specific search space or the common search space based on the UE's RRC configuration. Additionally or alternatively, responsive to successfully decoding a PDCCH candidate according to a DCI format (e.g., DCI format 1) defined by a first one of the CSS or the USS as having the same payload size as a different DCI format (e.g., DCI format 1A) defined by a second one of the CSS and the USS, the UE 24 interprets the DCI information fields of the decoded candidate as those fields are defined in the CSS or the USS, depending on the UE's RRC configuration.

Irrespective of the particular terminology used, embodiments herein prove to be an advantageous way of addressing significant problems that would otherwise be caused under certain circumstances by ambiguity concerning how to properly interpret the bit fields of a DCI message. As recognized herein, problems in LTE-based systems concern the fact that such ambiguity would otherwise severely impair the coverage and/or scheduling of a secondary cell compared to that of the primary cell 26.

More particularly in this regard, one of the important tools to allow good performance on an aggregated secondary cell to have good channel quality information, i.e. channel state information (CSI) reports. In practice this means that the network needs to acquire aperiodic CSI reports. The aperiodic CSI reports are important to allow link adaption and scheduling of data with adequate performance on both the secondary cell and the primary cell. The base station (i.e., eNB) requests aperiodic CSI from a UE by including such a request in a DCI message transmitted to the UE over the PDDCH on the primary cell. Specifically, the network includes a request for aperiodic CSI in an UL grant transmitted to the UE over a PDCCH on the primary cell.

The triggering of aperiodic CSI is defined differently depending on if the UL grant is received by the UE in the common search space (CSS) or the UE-specific search space (USS). In the common search space, aperiodic CSI can only be requested for the primary cell in DL with DCI format 0. If the UE receives the UL grant in the UE-specific search space, a two bit indicator is used for triggering the aperiodic CSI, wherein certain bit combination are configurable so that aperiodic CSI can be requested for both secondary cell and/or primary cell.

This triggering behavior above allows in the generic case the eNB to request aperiodic CSI for both primary cell and the secondary cell. In case that the DCI format 0/1a has the same payload size in USS and CSS and the same first CCE index between the USS and CSS, the UE (according to known approaches specified in section 9.1.1 of TS 36.213 V11.1.0) shall assume that the DCI message it receives is associated with the CSS. How often this occurs or not is mainly dependent on system bandwidth.

In Table 1 the different payload sizes of DCI format 0/1a in the CSS and USS when the UE is configured with one secondary downlink carrier is shown. It can be observed based on the table that DCI format 0/1a has the same size in the common and UE specific search space for system bandwidths of 1.4, 5 and 10 MHz. The results vary dependent on system bandwidth due to that the number of padding bits introduced in DCI format 0 is different for different system bandwidths.

TABLE 1

DCI format length in CSS and USS for DCI format 0/1a

| System BW | UE specific SS (bit length) | Common SS (bit length) |
|---|---|---|
| 1.4 MHz | 37 | 37 |
| 3 MHz | 39 | 38 |
| 5 MHz | 41 | 41 |
| 10 MHz | 43 | 43 |
| 15 MHz | 44 | 43 |
| 20 MHz | 45 | 44 |

It is then important to note here that the common search space has the aggregation levels 4 and 8 while the UE-specific search space has the aggregation levels 1, 2, 4 and 8. The impact of aggregation level 4 and 8 overlapping between the UE-specific search space and common search space is that the eNB cannot request aperiodic CSI for a secondary cell assuming that aggregation level. The blocking probability between the common and UE-specific search space given the problematic bandwidths in Table 1 is presented in Table 2. The results in Table 2 assume a physical hybrid automatic repeat request (HARQ) indicator channel (PHICH) configuration of Ng=1. The results are present considering the availability of the UE-specific search space on aggregation level 4 and 8 for each corresponding system bandwidth together with the amount orthogonal frequency division multiplexing (OFDM) symbols allocated by physical downlink control channel (PDCCH).

TABLE 2

Block probability of USS and CSS at aggregation level 4 and 8

| | Aggregation level | | | | | |
|---|---|---|---|---|---|---|
| | 4 CCEs | | | 8 CCEs | | |
| Bandwidth/CFI | 1* | 2* | 3* | 1 | 2 | 3 |
| 1.4 MHz | 100% | 100% | 100% | N.A. | N.A. | N.A. |
| 5 MHz | 100% | 100% | 80% | 100% | 100% | 100% |
| 10 MHz | 100% | 67% | 40% | 100% | 67% | 40% |

*CFI values for 1.4 MHz corresponds to 2, 3 and 4 symbols for PDCCH respectively One or more embodiments herein recognize from Table 2 that the amount of possible locations to schedule a DCI message in the UE-specific search with an aggregation level of 4 and 8 is very limited for known approaches and not possible at all in most cases considering 5 and 1.4 MHz as system bandwidth. The above mentioned limitation results in that the coverage of the secondary cell is severely impaired for known approaches compared to the primary cell due to that there is no aperiodic CSI reports available for it. This is because the aggregation level of the DCI message used for requesting aperiodic CSI is limited to 1 and 2. That is, it is not possible for the eNB to request aperiodic CSI reports for the secondary cell in case the primary cell is of a small bandwidth size.

The above is described from the perspective of aperiodic CSI reporting together with CA. In case the UE is configured with cross-carrier scheduling, or aperiodic CSI reporting for multiple CSI processes, the same issue will also occur.

Indeed, in case the UE is configured with cross-carrier scheduling, the problematic cases are a different but related issue. In case of cross-carrier scheduling, this issue will affect the possibility to schedule the secondary UL carrier. The assumption is that the secondary UL carrier can only be scheduled by DCI format 0. Table 3 presents the DCI format 0 payload size in the UE-specific search given that the UE is configured with cross-carrier scheduling and carrier aggregation (CA).

TABLE 3

DCI format 0/1a size when configured withCA and cross-carrier scheduling

| System Bandwidth | DCI format 0/1a with CIF |
|---|---|
| 1.4 MHz | 41 |
| 3 MHz | 43 |
| 5 MHz | 44 |
| 10 MHz | 46 |
| 15 MHz | 47 |
| 20 MHz | 49 |

Studying the impact of cross-carrier scheduling by combining the results in Table 3 with Table 1, it can be observed that a DCI format 0 for a secondary cell has an equal length with the DCI format 0/1a in the common search space for the following CA configurations: (A) 5 MHz Primary cell and 1.4 MHz Secondary cell; (B) 10 MHz Primary cell and a 3 MHz Secondary cell; and (C) 20 MHz Primary cell and a 5 MHz Secondary cell. In case the system bandwidth is as large as 20 MHz the problem with collisions between the common and UE specific is not that severe. Instead focusing on the case of 5 and 10 MHz, the impact of the above limitation is that the scheduling of a secondary cell in UL will have less coverage than the scheduling of the primary cell in UL due to that the scheduling of UL secondary cell will be limited to 1 and 2 CCEs.

Thus, embodiments herein recognize that the method for the eNB to request aperiodic CSI for secondary cells is not reliable in the current version of 3GPP release 10 that employ known approaches. In most deployments, the eNB can only request CSI for UEs in good SINR. Furthermore, the same restriction (due to the same reason) applies to cross carrier scheduling in certain bandwidth combinations, and will potentially apply to any future 3GPP feature where extra bits are added in the Downlink Control Information (DCI) when the feature is activated. This severely impairs the coverage of a secondary cell compared to that of the primary cell.

Embodiments herein that configure a UE's assumption of USS or CSS via RRC advantageously improve the coverage of a secondary cell. Indeed, the embodiments enable the eNB to schedule a UE with higher aggregation levels (i.e., 4 and 8). This allows the eNB to request aperiodic CSI and schedule an UL secondary cell using such higher aggregation levels when reception quality in the UE is not good. This then results in additional user experience as a UE for example can operate with carrier aggregation for a larger part of the cell. That is, the coverage of the secondary cell as compared to known approaches is improved.

One or more other embodiments herein include still different ways of ensuring that the UE can request aperiodic CSI for multiple cells or processes, or scheduling all corresponding UL cells. According to some embodiments, for example, processing for doing this entails making the DCI payload size different between the common and UE-specific search space. Additionally or alternatively, other embodiments herein do this by changing the definition of bit fields in the DCI message in the common search space.

According to one embodiment, the trigger bit for aperiodic CSI in DCI format 0 that is transmitted by either PDCCH/EPDCCH to the UE by the eNB in the common search space indicates a set of CSI processes or CSI reports associated with different cells. The set of aperiodic CSI reports that are reported are based on a preconfigured message to the terminal which indicated which CSI processes or cells the aperiodic CSI reports belong to. In a further exemplification of the embodiment the configuration is done by RRC or MAC.

In another exemplification of the embodiment, the set that the UE is reporting aperiodic CSI for corresponds to either set 1 or set 2 from the configuration of triggering bit for aperiodic CSI requests in the UE-specific search space. These sets are given by either table 7.2.1-1A or 7.2.1-1 B in TS 36.213 V11.1.0, wherein 7.2.1-1A corresponds to which serving cells the CSI reporting is performed for and 7.2.1-1 B corresponds to which CSI processes the reporting is made for:

TABLE 7.2.1-1A

CSI Request field for PDCCH with uplink DCI format in USS

| Value of CSI request field | Description |
|---|---|
| '00' | No aperiodic CSI report is triggered |
| '01' | Aperiodic CSI report is triggered for serving cell c |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

TABLE 7.2.1-1B

CSI Request field for PDCCH/EPDCCH with uplink DCI format in USS

| Value of CSI request field | Description |
|---|---|
| '00' | No aperiodic CSI report is triggered |
| '01' | Aperiodic CSI report is triggered for a set of CSI process(es) configured by higher layers for serving cell c |
| '10' | Aperiodic CSI report is triggered for a $1^{st}$ set of CSI process(es) configured by higher layers |
| '11' | Aperiodic CSI report is triggered for a $2^{nd}$ set of CSI process(es) configured by higher layers |

Figure 5:
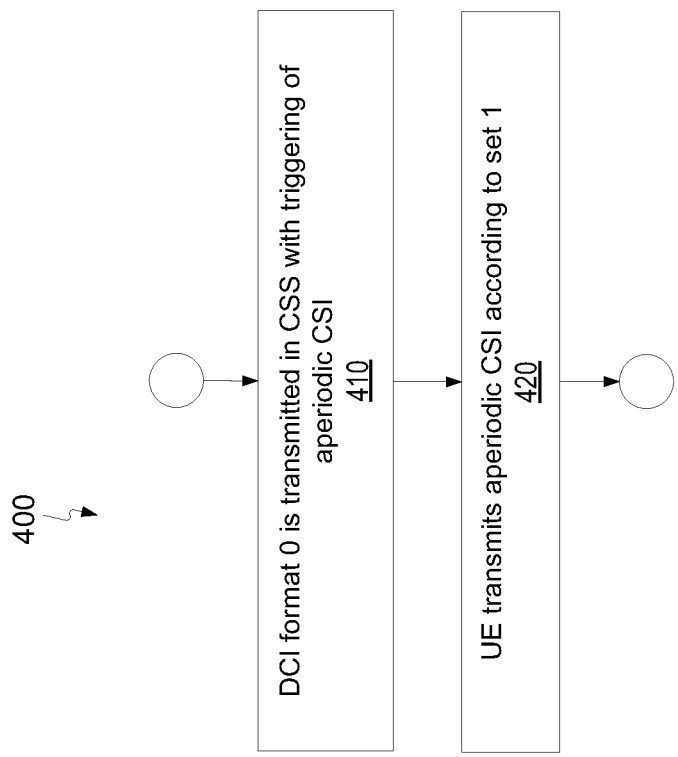
FIG. 5 is a logic flow diagram of a method according to one or more other embodiments.

As shown in FIG. 5, for example, a method 400 includes DCI format 0 being transmitted in the CSS with triggering of aperiodic CSI (Block 410). The method 400 also includes the UE transmitting aperiodic CSI according to set 1 (Block 420).

In another embodiment an additional padding bit(s) is added to a DCI message for the case that the DCI message is transmitted in the UE specific search and the said DCI message payload size is also a valid DCI message in the common search space but with different interpretation of the bit fields within the DCI message.

In another example of the same embodiment an additional padding bit(s) is added to a DCI message for the case that the DCI message is transmitted in the common search space and the said DCI message payload size is also a valid DCI message in the UE specific search space but with different interpretation of the bit fields within the DCI message.

Figure 6:
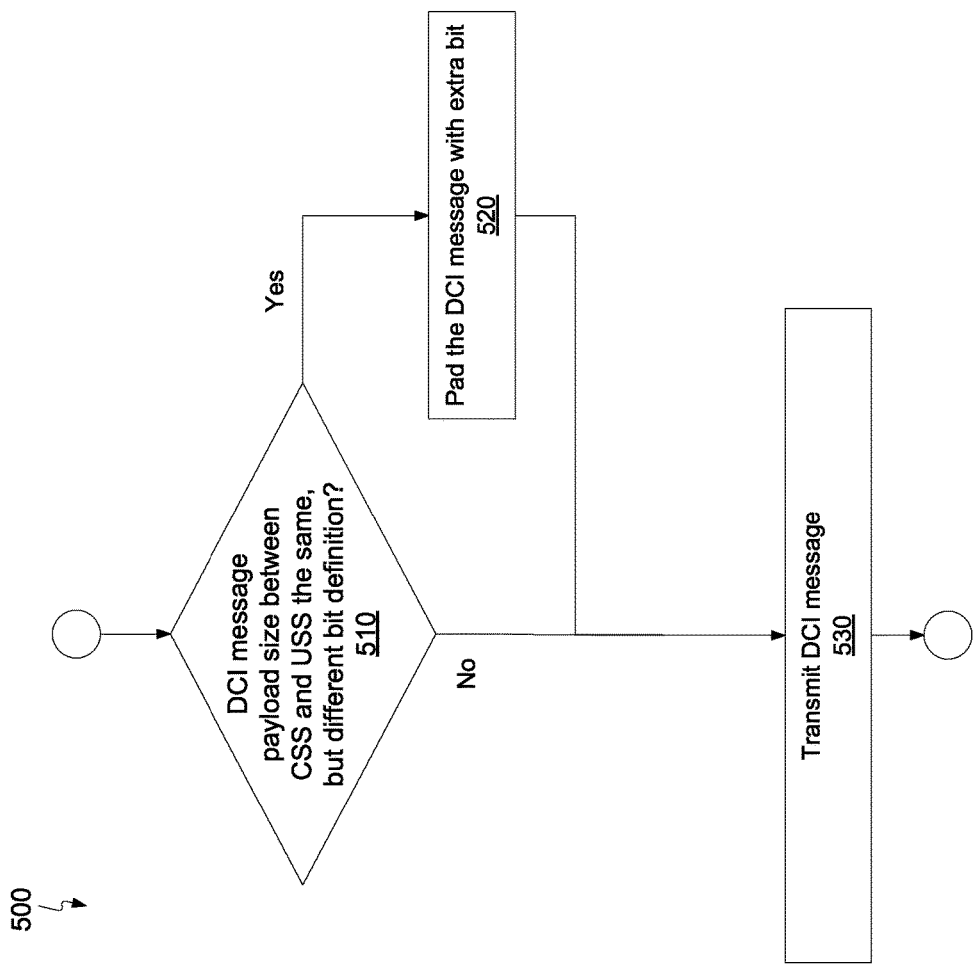
FIG. 6 is a logic flow diagram of a method implemented by a base station according to still other embodiments.

FIG. 6 illustrates this embodiment. As shown, a method 500 includes determining whether the DCI message payload size between the CSS and USS is the same, but the DCI message bit definition is different (Block 510). If this is the case (YES at Block 510), the DCI message is padded with an extra bit (Block 520). Otherwise (NO at Block 510), the DCI message is not padded with an extra bit. In either case, the DCI message is then transmitted (Block 530).

In a further exemplification of the embodiment the described DCI message may be of different DCI format types or may be of the same DCI format type but wherein the DCI message contains different bit fields depending on if it is located in the UE specific or common search space. For example, an additional padding bit is added to DCI format 0/1A in case DCI format has different meaning in UE-specific and common search and DCI format 0/1A has the same size in the common search space and the UE-specific search space. As this embodiment introduces a feature that involves changing the length of DCI formats to be different than that recognized in previous versions of LTE Rel-10, the feature may need to be configurable as either active or inactive to account for a change in DCI format length between two specific versions of Rel-10.

In a further example the additional padding bit(s) is always added if applicable DCI payload size can have different interpretation in the common or UE specific search space, independent of if the DCI message is transmitted on starting CCE and with a CCE length of PDCCH message which is also valid in the common search space, according to the above definitions.

In a further example, the additional padding bit(s) is added if applicable DCI payload size can have different interpretation in the common or UE specific search space and the starting CCE and/or the CCE length of the PDCCH message is valid in both common and UE specific search space.

The additional padding bit(s) is added by an eNB as part of the DCI format payload. The receiving UE would assume that the padding is present or not present given the above examples.

In an additional example the UE will assume that the padding bit(s) are present in the above given scenarios if it is configured to assume so. The configuration can for example be done through RRC or MAC.

The padding bits described in the embodiment can for example be bits defined as "0 bit value" or "1 bit value" added to the end of the DCI message.

In yet another embodiment, the UE can be scheduled with a specific RNTI in either the common or UE specific search space only. The described RNTI scrambles the CRC that is associated with the DCI format that is either transmitted on PDCCH/EPDCCH.

Figure 7:
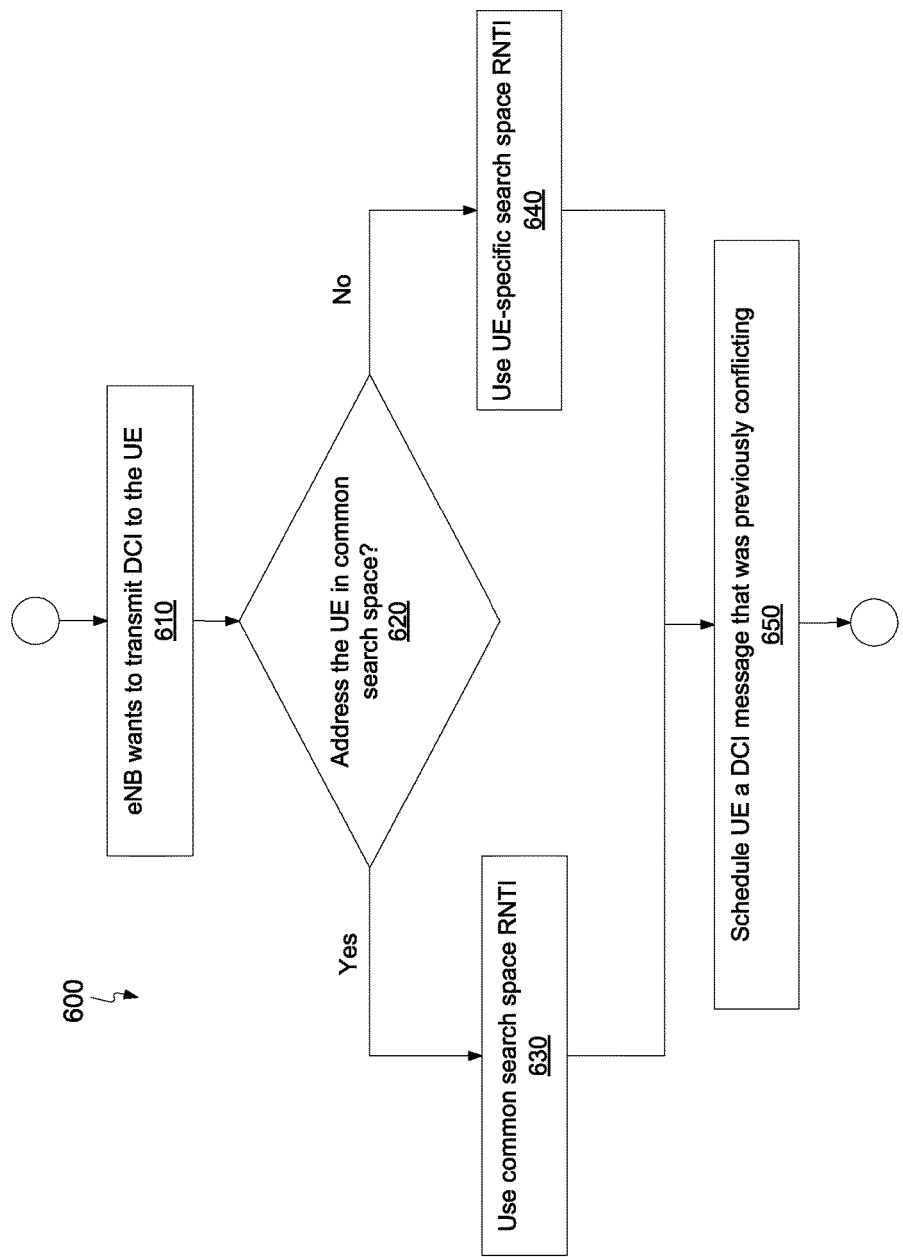
FIG. 7 is a logic flow diagram of a method implemented by a base station according to yet other embodiments.

FIG. 7 illustrates a method 600 according to this embodiment. As shown, the method includes the eNB determining to transmit DCI to a UE (Block 610). The method further includes the eNB determining whether or not to address the UE in the common search space (Block 620). If so, the eNB determines to use the UE-specific search space RNTI (Block 640). If not, the eNB determines to use the common search space RNTI (Block 630). In either case, the eNB then schedules the UE a DCI message that was previously conflicting (Block 650).

In one example of the embodiment, the eNB configures the UE with individual RNTIs to use for common and UE specific search space respectively.

In a further example of the embodiment, the eNB only sends the configured individual RNTIs in case that the DCI message is transmitted in the UE specific search and has the same payload size as a DCI message in the common search space but different interpretation of the bit fields within the DCI message.

In another example, the RNTI to use for common search space is a function of the RNTI to use for UE specific search space.

In a further example, the RNTI is different between common and UE specific search space only in case that the DCI message is transmitted in the UE specific search space and has the same payload size as a DCI message in the common search space but different interpretation of the bit fields within the DCI message.

Figure 8:
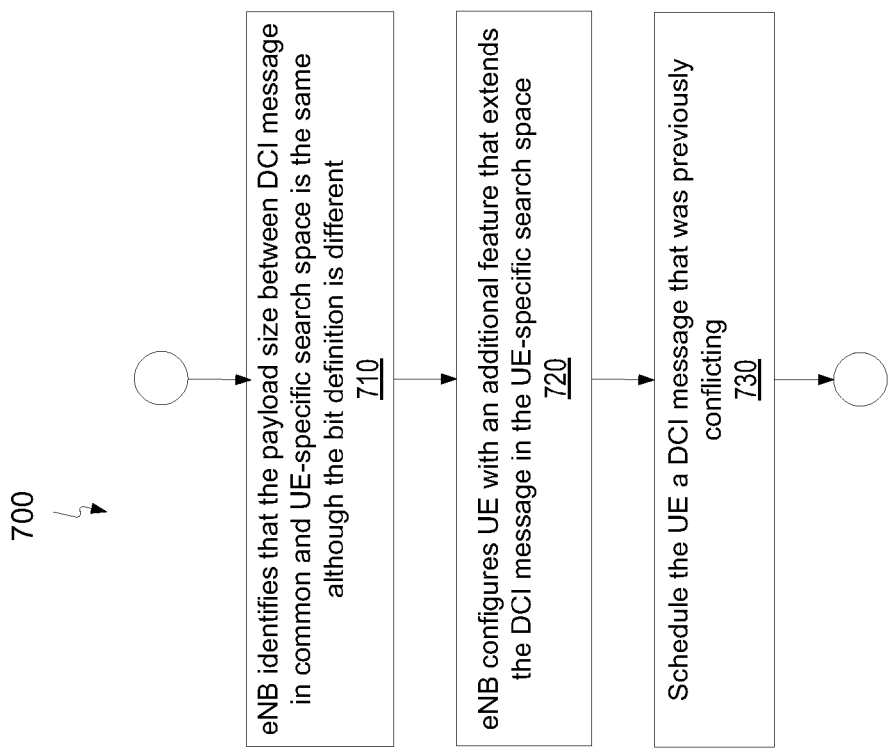
FIG. 8 is a logic flow diagram of a method implemented by a base station according to another embodiment.

FIG. 8 illustrates still another embodiment. As shown, a method 700 includes the eNB identifying a DCI message with the same payload size but different bit interpretation between the common and UE specific search space (Block 710). The method 700 further includes the eNB configuring the UE with additional features that enlarge the DCI payload size (i.e., extend the DCI message) in the UE specific search space, in order to avoid the above problem. An example of such a configuration is if the eNB configured a UE to operate with carrier aggregation and the primary cell is of 5 MHz. The eNB does then to avoid this issue in addition configure the UE with an additional feature. An example of such a feature is if the UE is in addition configured with aperiodic Sounding Reference Signals (SRS).

While the above embodiments have been described separately, two or more of the embodiments herein are in some cases used in combination.

Figure 9:
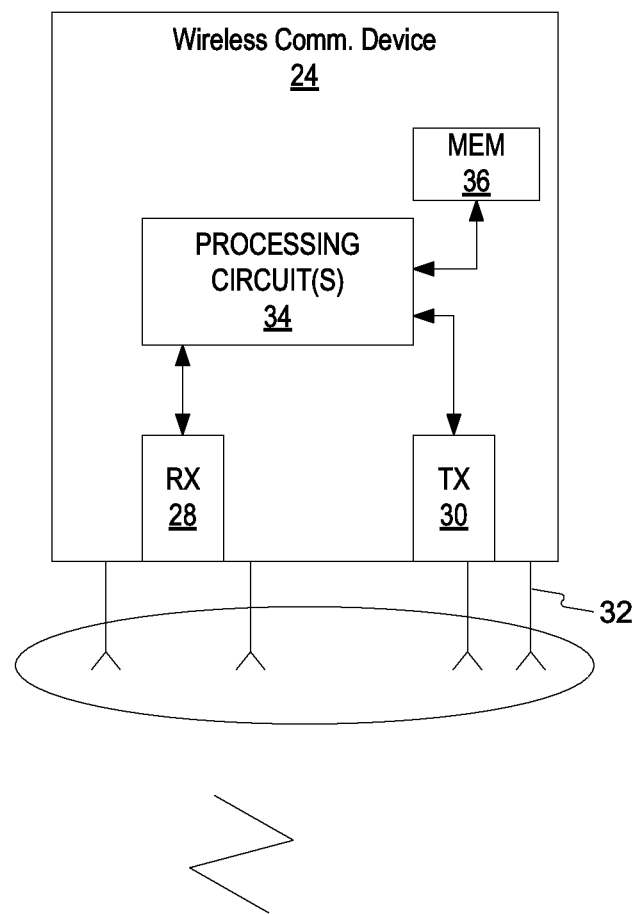
FIG. 9 is a block diagram of a user equipment according to one or more embodiments.

In view of the modifications and variations described above for methods herein, those skilled in the art will appreciate that FIG. 9 illustrates a wireless communication device (i.e., a user equipment, UE) 24 configured to perform the processing described above. In this regard, the device includes one or more communication interfaces configured to communicatively connect the device 24 to one or more base stations 20 in a wireless communication system 10. As shown, these one or more communication interfaces comprise a receiver (RX) 28 and a transmitter (TX) 30 coupled to one or more antennas 32. The device 24 also includes one or more processing circuits 34 configured, e.g., in conjunction with memory 36, to implement the processing described above.

Figure 10:
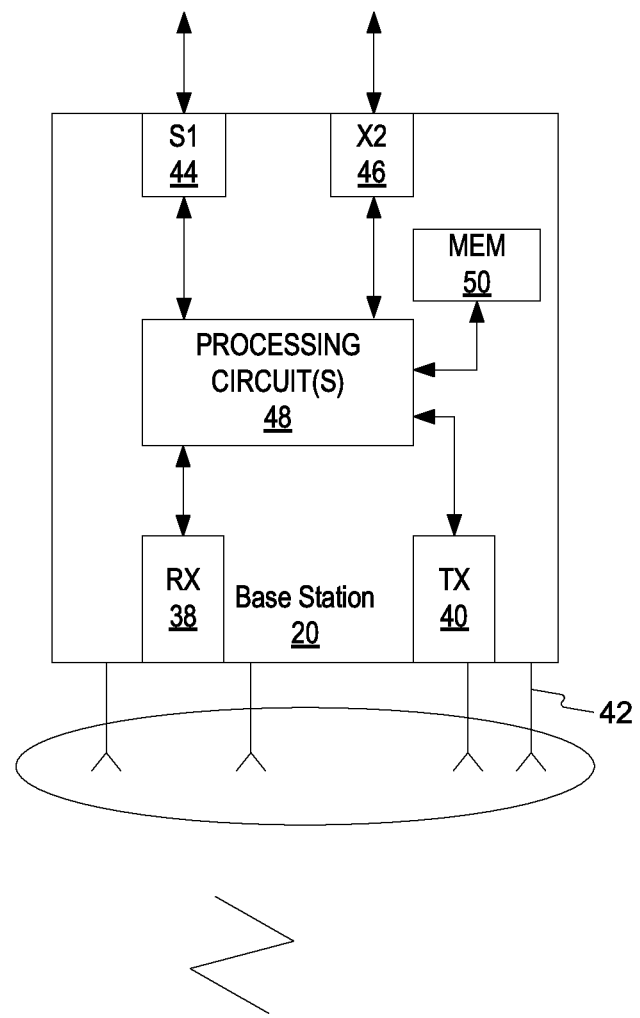
FIG. 10 is a block diagram of a base station according to one or more embodiments.

Those skilled in the art will appreciate that FIG. 10 illustrates a base station 20 configured to perform the processing described above. The base station 20 similarly includes one or more communication interfaces configured to communicatively connect the base station 20 to one or more wireless communication devices 24. As shown, these one or more communication interfaces comprise a receiver (RX) 38 and a transmitter (TX) 40 coupled to one or more antennas 42. The base station 20 however also includes one or more communication interfaces configured to communicatively connect the base station 20 to one or more other base stations and/or other network nodes. As shown, these interfaces include the S1 interface 44 and X2 interface 46 in accordance with LTE standards. Regardless, the base station 20 further includes one or more processing circuits 48 configured, e.g., in conjunction with memory 50, to implement the processing above.

Those skilled in the art will of course appreciate that the above figure is simply an example, and that the depicted circuits may be realized, implemented, or otherwise configured within the node, based upon the execution of computer program instructions stored in memory or within another computer readable medium in the entity. Thus, the circuits discussed above may comprise a processor circuit (consisting of, for example, one or more microprocessors, microcontrollers, digital signal processors, or the like) configured with appropriate software and/or firmware in memory to carry out one or more of the techniques discussed above. The circuits may alternatively be implemented (in whole or in part) by one or more dedicated integrated circuits, such as one or more field-programmable gate arrays (FPGAs) or application-specific integrated circuits (ASICs).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A user equipment (UE) configured to receive downlink control information (DCI) transmitted to the UE by a primary cell in a wireless communication system, the UE comprising one or more processing circuits configured to:
   receive a DCI message which has a common payload size and the same first control channel element index, but different bit fields, in a common search space and a UE specific search space;
   select, based on radio resource control (RRC) configuration of the UE, between a first assumption in which the received DCI message is assumed to be transmitted by the primary cell in the common search space and a second assumption in which the received DCI message is assumed to be transmitted by the primary cell in the UE specific search space; and
   interpret bit fields of the received DCI message according to the selected assumption.

2. The UE of claim 1, wherein the one or more processing circuits are configured to select the first assumption by default and to select the second assumption if the UE is configured by RRC to select the second assumption.

3. The UE of claim 1, wherein the one or more processing circuits are configured to select the first assumption or the second assumption depending respectively on whether a parameter in a received RRC message has a first value or a second value.

4. The UE of claim 1, wherein said DCI message has the same DCI format in said search spaces.

5. The UE of claim 1, wherein said DCI message has different DCI formats in said search spaces.

6. A base station configured to provide a primary cell in a wireless communication system that sends downlink control information (DCI) to a user equipment (UE), the base station comprising one or more processing circuits configured to:
   transmit a DCI message which has a common payload size and the same first control channel element index, but different bit fields, in a common search space and a UE specific search space; and
   configure the UE by radio resource control (RRC) to select between a first assumption in which the received DCI message is assumed to be transmitted by the primary cell in the common search space and a second assumption in which the received DCI message is assumed to be transmitted by the primary cell in the UE specific search space, and to interpret bit fields of the received DCI message according to the selected assumption.

7. The base station of claim 6, wherein the one or more processing circuits configure the UE by RRC to select the second assumption, instead of selecting the first assumption by default.

8. The base station of claim 6, wherein the one or more processing circuits are configured to send an RRC message to the UE with a first value or a second value for a parameter in the RRC message in order to configure the UE to select the first assumption or the second assumption, respectively.

9. The base station of claim 6, wherein said DCI message has the same DCI format in said search spaces.

10. The base station of claim 6, wherein said DCI message has different DCI formats in said search spaces.

11. The base station of claim 6, wherein the one or more processing circuits are configured to:
   identify said DCI message to be sent to the UE as having said common payload size in said search spaces, even though the definition of the bit fields in the DCI message is different in said search spaces;
   responsive to said identification, configure the UE by RRC to select the first assumption; and
   responsive to said configuring, schedule said DCI message to be sent to the UE.

12. A method implemented by a user equipment (UE) for receiving downlink control information (DCI) transmitted to the UE by a primary cell in a wireless communication system, the method comprising:
   receiving a DCI message which has a common payload size and the same first control channel element index, but different bit fields, in a common search space and a UE specific search space;
   selecting, based on radio resource control (RRC) configuration of the UE, between a first assumption in which the received DCI message is assumed to be transmitted by the primary cell in the common search space and a second assumption in which the received DCI message is assumed to be transmitted by the primary cell in the UE specific search space; and
   interpreting bit fields of the received DCI message according to the selected assumption.

13. The method of claim 12, wherein said selecting comprises selecting the first assumption by default and selecting the second assumption if the UE is configured by RRC to select the second assumption.

14. The method of claim 12, wherein said selecting comprises selecting the first assumption or the second assumption depending respectively on whether a parameter in a received RRC has a first value or a second value.

15. The method of claim 12, wherein said DCI message has the same DCI format in said search spaces.

16. The method of claim 12, wherein said DCI message has different DCI formats in said search spaces.

17. A method implemented by a base station providing a primary cell in a wireless communication system that sends downlink control information (DCI) to a user equipment (UE), wherein the method comprises:
   transmitting a DCI message which has a common payload size and the same first control channel element index, but different bit fields, in a common search space and a UE specific search space; and
   configuring the UE by radio resource control (RRC) to select between a first assumption in which the received DCI message is assumed to be transmitted by the primary cell in the common search space and a second assumption in which the received DCI message is assumed to be transmitted by the primary cell in the UE specific search space, and to interpret bit fields of the received DCI message according to the selected assumption.

18. The method of claim 17, wherein said configuring comprise configuring the UE by RRC to select the second assumption, instead of selecting the first assumption by default.

19. The method of claim 17, wherein said configuring comprises sending an RRC message to the UE with a first value or a second value for a parameter in the RRC message in order to configure the UE to select the first assumption or the second assumption, respectively.

20. The method of claim 17, wherein said DCI message has the same DCI format in said search spaces.

21. The method of claim 17, wherein said DCI message has different DCI formats in said search spaces.

22. The method of claim 17, further comprising:
   identifying said DCI message to be sent to the UE as having said common payload size in said search spaces, even though the definition of the bit fields in said DCI message is different in said search spaces;
   responsive to said identification, configuring the UE by RRC to select the first assumption; and
   responsive to said configuring, scheduling said DCI message to be sent to the UE.

23. The UE of claim 1, wherein the different bit fields are defined differently in the common search space and the UE-specific search space, and wherein in which of the common search space and the UE-specific search space the DCI message is assumed to be transmitted is based on the RRC configuration of the UE.

24. The UE of claim 1, wherein the one or more processing circuits are further configured to interpret the bit fields of the DCI message as those bit fields are defined in whichever of the common search space and the UE-specific search space the DCI message is assumed to be transmitted.

25. The UE of claim 1, wherein a cyclic redundancy check (CRC) for the DCI message is scrambled by a radio network temporary identity (RNTI) specifically assigned to the UE as the intended recipient of the DCI message.

26. The UE of claim 1, wherein the one or more processing circuits are further configured to switch between assuming the DCI message is transmitted in the common search space and assuming the DCI message is transmitted in the UE-specific search space, based on RRC configuration of the UE.

27. The base station of claim 6, wherein the different bit fields are differently defined bit fields, and wherein in which of the common search space and the UE-specific search space the DCI message is assumed by the UE to be transmitted is configured by RRC.

* * * * *